(12) United States Patent
Wirth et al.

(10) Patent No.: US 7,240,689 B2
(45) Date of Patent: Jul. 10, 2007

(54) MULTIPLE COMPONENT MIXING HEAD

(75) Inventors: Jürgen Wirth, Köln (DE); Reiner Raffel, Siegburg (DE)

(73) Assignee: Hennecke GmbH, Leverkusen (DE)

( * ) Notice: Subject to any disclaimer, the term of this patent is extended or adjusted under 35 U.S.C. 154(b) by 279 days.

(21) Appl. No.: 11/116,635

(22) Filed: Apr. 28, 2005

(65) Prior Publication Data

US 2005/0241708 A1    Nov. 3, 2005

(30) Foreign Application Priority Data

May 3, 2004    (DE) .................. 10 2004 021 563

(51) Int. Cl.
*B29B 7/76* (2006.01)
*B01F 3/00* (2006.01)

(52) U.S. Cl. ............... 137/245.5; 137/898; 366/159.1; 366/162.5

(58) Field of Classification Search ............ 137/245.5, 137/898; 366/159.1, 162.5; 422/217, 228
See application file for complete search history.

(56) References Cited

U.S. PATENT DOCUMENTS

| 3,975,128 | A | | 8/1976 | Schlüter ................ 425/207 |
| 4,332,335 | A | | 6/1982 | Fiorentini ............... 222/145 |
| 4,707,339 | A | | 11/1987 | Johnson et al. ......... 422/133 |
| 4,775,517 | A | * | 10/1988 | Sulzbach ............. 366/159.1 |
| 5,498,151 | A | * | 3/1996 | Nennecker ............. 425/4 R |
| 6,065,862 | A | * | 5/2000 | Althausen et al. ..... 366/162.5 |
| 6,079,867 | A | | 6/2000 | Fiorentini et al. ..... 366/159.1 |

FOREIGN PATENT DOCUMENTS

| DE | 93 15 493 U1 | 12/1993 |
| GB | 2 129 324 A | 5/1984 |

* cited by examiner

*Primary Examiner*—Stephen M. Hepperle
(74) *Attorney, Agent, or Firm*—Joseph C. Gil; Lyndanne M. Whalen; John E. Mrozinski, Jr.

(57) ABSTRACT

The invention relates to a mixing head and to a method of mixing at least one polyol component and at least one isocyanate component and where appropriate additives, to form a polyurethane reaction mixture.

13 Claims, 2 Drawing Sheets

MULTIPLE COMPONENT MIXING HEAD

FIELD OF THE INVENTION

The present invention relates to a mixing head for mixing at least one polyol component and at least one isocyanate component and where appropriate, additives, to form a polyurethane reaction mixture.

BACKGROUND OF THE INVENTION

When polyurethane moldings are made, conventionally for each shot a plurality of components (isocyanate, polyol, propellant, additives, etc.) are metered into a mixing chamber, mixed there and fed to a mold. For this mixing task, multiple component mixing heads are used, enabling the various components to be mixed at the same time.

Multiple component mixing heads of this kind conventionally have a cylindrical mixing chamber which is closed at one end and into which the various components are injected by way of inlet nozzles arranged on the periphery. In this arrangement, the inlet nozzles are conventionally arranged on a circular line so that the component jets entering the mixing chamber meet and are mixed. Generally, a cylindrical outlet channel closed at one end is arranged downstream of the mixing chamber in the outgoing direction, and the mixture produced exits the mixing head through this channel. Conventionally, the mixing chamber and the outlet channel are arranged at an angle of 90° with respect to one another so that the mixture is diverted as it leaves the mixing chamber and so kinetic energy is dissipated.

In this arrangement, these mixing heads furthermore have a control slide means which is arranged in the mixing chamber movably in the axial direction and which, in the retracted or rear position, frees the inlet openings so that the components can come out of the inlet nozzles and into the mixing chamber and meet (injection position), and which, in the extended or front position, connects the inlet nozzles to grooves which are made in the control slide means and through which the components flow to the respective outlets arranged on the cylindrical wall surface, through which they can be guided back into their reserve containers again (return position, recirculation).

The mixing heads typically have a cleaning piston or cleaning slide means which is arranged in the outlet channel movably in the axial position. The cleaning piston allows residues of the components which are still in the outlet channel after the end of injection to be removed so that the outlet channel is prevented from clogging.

Because these mixing heads have both a control slide means and a cleaning slide means, these mixing heads are also called two-slide mixing heads. Examples of mixing heads of this kind are described in DE-A-23 27 269, DE-C-29 07 938 and DE-A-30 40 922.

Hitherto, two-component, four-component and six-component mixing heads have been usual, with a separate groove in the control slide means being associated with each component.

In this arrangement, in particular with six-component mixing heads, the following problem has to be addressed: the diameter of the outlet channel is more or less predetermined because an average outgoing velocity of approximately 0.5 to 1 m/s, depending on the viscosity of the mixture, must be maintained as a minimum. Otherwise, the outflowing reaction mixture may not completely fill the cross-section of the outlet channel, which results in disruptive turbulence and in air entering the mixture.

With the known types of construction of multiple component mixing heads having two slide means, the diameter of the mixing chamber is always smaller than the diameter of the outlet channel, as it has been assumed up until now that the mixing chamber must be particularly small in high-pressure mixing because a small spacing between the openings of the inlet nozzles for the various components improves the atomizing effect of the component jets and hence also the extent of mixing (DE-C-29 07 938).

However, as a result of the very small diameters of the mixing chambers as known in the art, and in particular with small outgoing quantities, a structural problem arises: it is then the case that for example six control grooves have to be arranged spatially parallel next to one another on the limited periphery of the control slide means, while still leaving space for the seal between the control grooves.

As a consequence of this problem, in the case of the known constructions the grooves become too narrow and the loss in pressure during recirculation becomes too great. The solution to this dilemma has hitherto been to allow only a partial flow of the components through the grooves during recirculation, and to have most of the component flows guided past the mixing head by way of bypass lines, in which case, once the control slide means has been moved around into the injection position, they have also to be deflected. However, this is a complicated and relatively expensive solution born out of need.

A further problem of the known constructions is part of a basic problem of high-pressure mixing, in particular when small quantities are ejected.

Taking as a starting point laminar jets from the nozzles, it is necessary to achieve good mixing of the components which is as complete as possible in as short a time as possible, without the aid of additional fittings such as those installed in a static mixer. In ideal, undisrupted and hence laminar flow conditions in the mixing chamber, this is in principle achievable only with difficulty, as a diffuse transport of the material cannot make a more than negligible contribution to the mixing because of the short dwell times.

In a flow of this kind, and as a function of the jet pulses of the component jets, a theoretical impact point is formed around which a pressure gradient field is produced in the manner of a source point. This ensures that the individual flow paths to a greater or lesser extent approach this impact point as a function of their remaining velocity, with the dynamic kinetic energy being substantially converted to pressure energy and in addition to a certain extent being dissipated into heat as a result of the viscosity forces. This pressure energy is converted to kinetic energy again to give a smaller pressure. In this case, however, where there is an ideal undisrupted flow, a more or less stable interface is produced between the components, which in practice is not penetrated. This means that the components remain substantially unmixed.

SUMMARY OF THE INVENTION

The present invention thus provides a mixing head for simultaneous mixing of a plurality of components, by which an outflow of mixture with laminar flow and free of bubbles can be achieved and which at the same time can be operated with low pressure losses in the grooves of the control slide means for the undivided flows of components in the recirculation phase.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
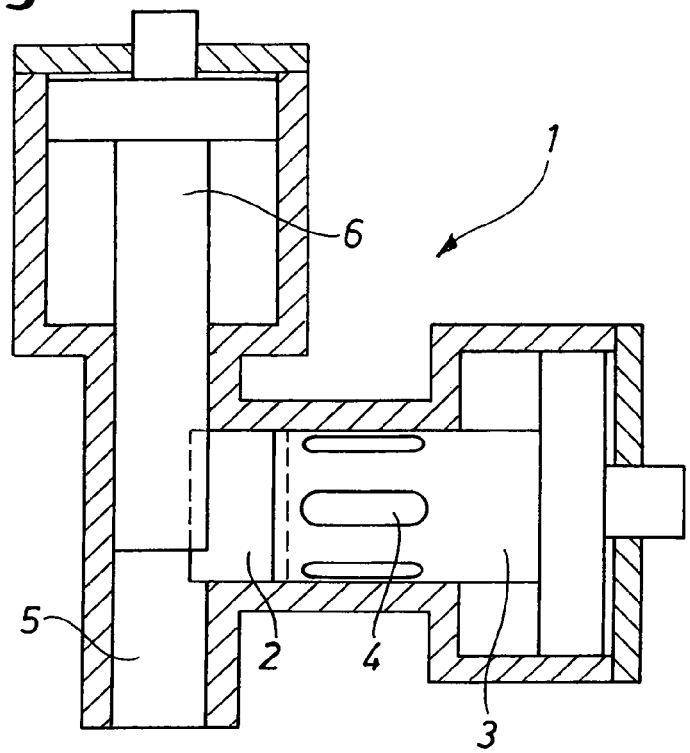
FIG. 1 shows a mixing head in accordance with the invention.

The present invention will now be described for purposes of illustration and not limitation. Except in the operating examples, or where otherwise indicated, all numbers expressing quantities, percentages and so forth in the specification are to be understood as being modified in all instances by the term "about."

The invention relates to a mixing head for mixing at least one polyol component and at least one isocyanate component and where appropriate, additives, to form a polyurethane reaction mixture, containing a cylindrical mixing chamber on which at least two inlet nozzles for the respective components are arranged, distributed over the periphery, a control slide means which is arranged in the mixing chamber movably in an axial direction between a front position and a rear position, and on the periphery whereof grooves are arranged, with the components being able when the control slide means is in the front position to enter the grooves through the inlet nozzles, flow through the grooves and leave the grooves again through outlets, and with the components being able when the control slide means is in the rear position to enter the mixing chamber through the inlet nozzles, an outlet channel which is connected downstream of the mixing chamber in the outgoing direction of the polyurethane reaction mixture and which is arranged at an angle of between 40 and 140° with respect to the mixing chamber, and a cleaning slide means which is arranged in the outlet channel movably in the axial direction, characterized in that the diameter, D, of the mixing chamber is larger by a factor of 1.1 to 5, preferably by a factor of 1.2 to 3, particularly preferably by a factor of 1.5 to 2, than the breadth, B, of the projected surface of the outlet opening leading out of the mixing chamber into the outlet channel.

The diameter of the outlet channel is in this case more or less predetermined since an average outgoing velocity of approximately 0.5 to 1 m/s, depending on the viscosity of the mixture, must be maintained as a minimum.

The diameter, D, of the control slide means, which corresponds approximately to the diameter of the mixing chamber, may in the case of the mixing head according to the invention be selected to be as large as the number and size of the control grooves necessitate. The diameter of the outlet channel is in turn matched to the range of the outgoing quantity for which the mixing head is designed. However, this means that the diameter, D, of the mixing chamber is larger than the breadth, B, of the projected surface of the outlet opening from the mixing chamber into the outlet channel.

As a result of the dimensioning of the mixing chamber and the outlet channel in accordance with the invention, mixing of the components can be drastically improved, in particular in the case of a component flow of low Reynolds number (Re<200 of the component flow in the inlet nozzles). This is because narrow limits are imposed on the technically achievable Reynolds numbers with small outgoing quantities and with high viscosities, as the velocities at which the components flow into the inlet nozzles cannot be raised above certain levels. The reasons for this are, on the one hand, that the achievable pressures (compressive strength of the machine parts used, accuracy of metering of the pumps used) have an upper limit, and on the other, that the nozzle diameters (reasons linked to production engineering, filtering problems) cannot be made smaller than certain values.

Depending on the dimensioning of the mixing chamber, the flow above certain Reynolds numbers becomes unsteady. These limits may be shifted downwards by the dimensioning of the mixing chamber and the outlet channel in accordance with the invention. In the case of unsteady flow conditions, however, mixing of the components is substantially better than with laminar flow conditions.

In the case of a substantially laminar flow, only very restricted mixing of the components takes place, as although the nozzle jets—which are typically laminar—meet at high speed, substantially because of their pulse forces they only deflect one another without actually penetrating one another. A laminar impact point is formed at which the jets meet. Around this impact point there prevails a high pressure which because of the laminar flow conditions is constant over time and which results in the jets being deflected to the side.

By contrast, in the case of an unsteady flow, a stable impact point of the jets is not formed, but rather the jets can penetrate one another substantially better because of the unsteady flow conditions and pressure gradient. In this arrangement, turbulent factors which ensure good mixing of the components are formed.

It has been found that the conversion of laminar flow conditions into unsteady flow conditions also depends, in addition to the Reynolds number, substantially on the geometry of the mixing chamber. A relatively large diameter, D, of the mixing chamber in relation to the diameter, d, of the inlet nozzles results in this conversion point being reached even at relatively small Reynolds numbers and relatively low flow rates of the components, as a result of which mixing is substantially improved. In this arrangement, however, it has to be taken into account that the diameter, d, of the inlet nozzles cannot in principle be selected freely, but is preferably selected such that the required or maximum practically possible nozzle velocity is achieved, depending on the shape of the nozzles as a result of the cross-section of the hole itself or, in the case of pin-type nozzles, with appropriate placement of the nozzle pins. The selection of the diameter of the inlet nozzles is, in this case, subject to certain lower limits as already indicated above.

For this reason, the requirement for a large ratio between the diameter of the mixing chamber and the diameter of the inlet nozzles corresponds in principle to the requirement for a large diameter of the mixing chamber.

At the same time, however, the mixing chamber cannot be designed to exceed a certain size, because otherwise, and in particular with relatively high viscosities, the pulse forces of the jets dissipate even before they meet in the impact plane to such a great extent that the jets can no longer be mixed sufficiently well even in unsteady conditions.

For this reason, the ratio between the diameter, d, of the largest of the inlet nozzles and the diameter, D, of the mixing chamber preferably lies between 0.01 and 0.2, particularly preferably between 0.01 and 0.15, and most particularly preferably between 0.015 and 0.1.

As a result of the dimensioning of the mixing chamber and the outlet channel in accordance with the invention, a further problem is solved. For trouble-free mixing, the mixing chamber has to be partitioned so that unmixed part flows can escape at an early stage. This partitioning is achieved in this arrangement in that during the injection mode the cleaning slide means partly covers the outlet opening leading out of the mixing chamber into the outlet channel. If, on the other hand, the outlet from the mixing chamber becomes too small because the cleaning slide means covers too large a part of the outlet surface leading out of the mixing chamber into the outlet channel, the outlet velocity of the mixture will become too high and the mixture will flow out jerkily and with splashing.

Because the high pulse forces of the nozzle jets mean that the mixing zones lie substantially in the region of the walls of the mixing chamber, the outlet from the mixing chamber in the vicinity of the mixing chamber wall is particularly critical. This is particularly true in the case of multiple component mixing heads in which highly variable component allocations and hence highly variable positions of the mixing zones are to be expected.

As a result of the dimensioning of the mixing chamber and the outlet channel in the mixing head according to the invention, the proportion of wall surface of the mixing chamber which opens directly into the outlet channel or the outlet opening from the mixing chamber is reduced, because the mixing chamber has a larger diameter than the outlet channel and hence a substantially rectangular shape of the projected surface of the outlet opening from the mixing chamber is produced.

In addition, this more compact shape of the outlet cross-section having a substantially rectangular shape, by comparison with the narrower cross-section along a circular line, is favorable for the feeding back of disruptive variables in the outlet to the flow conditions in the mixing chamber, which in turn has a favorable effect on the conversion of a substantially laminar flow into unsteady flow conditions in the mixing chamber.

To summarize, the construction of the mixing chamber in accordance with the invention combines the following important advantages:

1. relatively large mixing chamber diameters result in structural advantages for the shape of the recirculation grooves and sealing between the recirculation grooves;
2. relatively large mixing chamber diameters have a favorable effect on the conversion of a substantially laminar flow into a substantially unsteady flow, which markedly improves the mixing action;
3. a calmer output of the mixture into the outlet, at the same time as efficient partitioning of the mixing chamber as a result of a more suitable position for the outlet cross-section leading out of the mixing chamber in relation to the flow conditions in the mixing chamber; and
4. better feeding back, through disruptive variables in the outlet of the mixing head, to flow conditions in the mixing chamber, at the same time as efficient partitioning of the mixing chamber, has a favorable effect on the conversion of a substantially laminar flow into a substantially unsteady flow, which markedly improves the mixing action.

In a preferred embodiment of the mixing head of the present invention, the ratio between the height, A, of the rectangular projected surface of the outlet opening leading out of the mixing chamber into the outlet channel which is not covered by the cleaning slide means and the breadth, B, of the rectangular projected surface of the outlet opening leading out of the mixing chamber into the outlet channel A:B is 0.05 to 5, particularly preferably 0.05 to 1, more particularly preferably 0.1 to 1, most particularly preferably 0.2 to 0.5.

In a further embodiment of this mixing head, the ratio between the length, L, of the mixing chamber in the axial direction, limited by the end face of the control slide means on the one side and by the outlet opening leading out of the mixing chamber into the outlet channel on the other, and the diameter, D, of the mixing chamber H:D is 0.1 to 1, particularly preferably 0.2 to 0.8, most particularly preferably 0.3 to 0.6. In fact, minimizing the height, H, of the mixing chamber restricts the mixing zone substantially to the jet level of the nozzles, and so dead zones outside this mixing zone are eliminated.

The invention furthermore relates to a method of mixing at least one polyol component and at least one isocyanate component and where appropriate, additives, to form a polyurethane reaction mixture, in which the components used are metered into the mixing chamber of the mixing head according to the invention and are mixed there to form a polyurethane reaction mixture.

FIG. 1 shows a mixing head 1 according to the present invention, containing a cylindrical mixing chamber 2. Arranged in the mixing chamber 2 is a control slide means 3 which is arranged in the mixing chamber movably in the axial direction between a front position and a rear position. In FIG. 1, the control slide means is located in the rear position (injection mode). Arranged in the control slide means 3 are grooves (control grooves) 4 through which the components can flow during recirculation. The mixing head 1 furthermore has an outlet channel 5 having a cleaning slide means 6 arranged therein such that it is movable in the axial direction. In this arrangement, the outlet channel 5 is arranged at a right angle to the mixing chamber 2. The reaction mixture emerging from the mixing chamber 2 flows through the outlet channel 5 after the mixing and then enters the mold in calmed flow.

Figure 2:
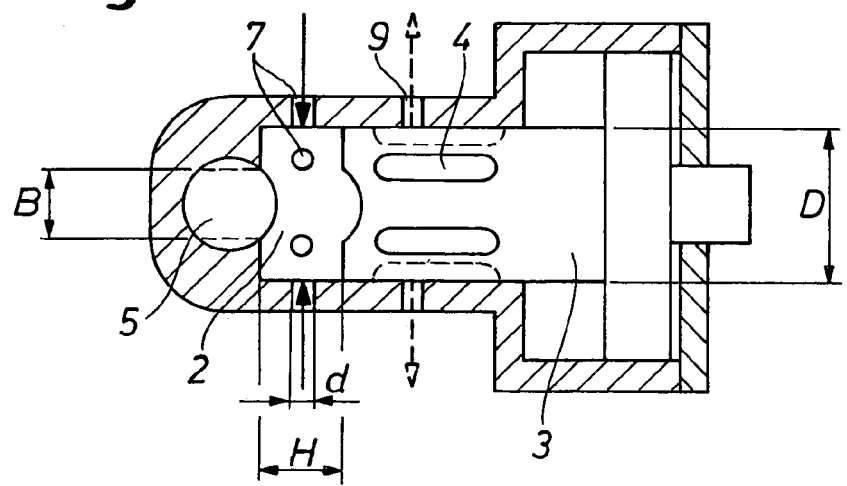
FIG. 2 illustrates a section through the mixing head illustrated in FIG. 1.

FIG. 2 shows a section through the mixing head illustrated in FIG. 1. Here, it is clear that the diameter, D, of the mixing chamber 2 is markedly larger than the breadth, B, of the projected surface of the outlet opening leading from the mixing chamber 2 into the outlet channel 5. The projected surface is in this case to be understood as the planar surface which is limited by those sides of the outlet opening aligned with the axial direction of the outlet channel. The inlet nozzles 7, which have a diameter, d, and are evenly distributed over the periphery of the mixing chamber along the line of a circle, open into the mixing chamber 2. The arrows drawn in FIG. 2 in solid lines and dotted lines indicate the entry of the components into the mixing chamber through the inlet nozzles 7, and the exit which is possible on recirculation (the control slide means is in injection mode in FIG. 2) of the components through outlets 9 arranged on the cylindrical wall surface, respectively. The length, H, of the mixing chamber 2 in the axial direction is limited by the end face of the control slide means 3 on the one side and by the outlet opening leading out of the mixing chamber 2 into the outlet channel 5 on the other side.

Figure 3:
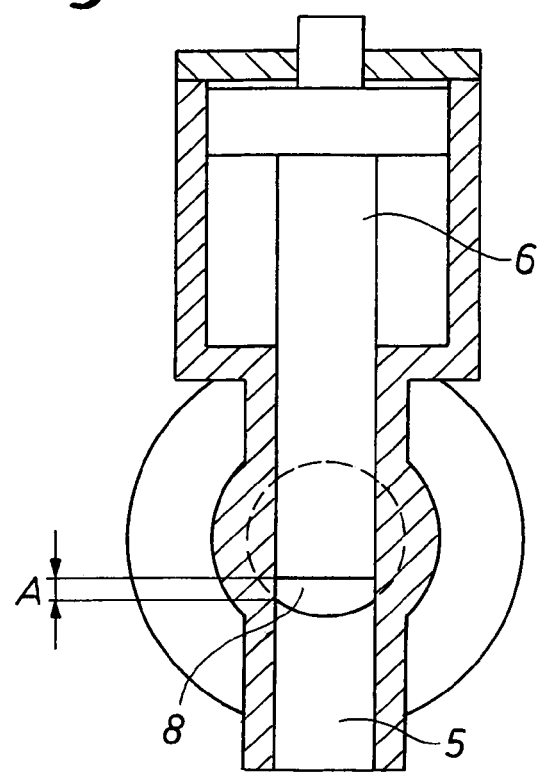
FIG. 3 depicts a section through the outlet channel of the mixing head illustrated in FIGS. 1 and 2.

FIG. 3 shows a section through the outlet channel 5 of the mixing head illustrated in FIGS. 1 and 2. In this arrangement, the cleaning slide means 6 is arranged to be axially displaceable in the outlet channel 5 and covers part of the outlet opening 8 leading out of the mixing chamber 2. In this arrangement, the height, A, indicates that part of the total side length of the outlet opening 8 leading out of the mixing chamber 2, or that part of its rectangular projected surface which is not covered by the cleaning slide means 6. In this arrangement, the side length relates to the sides of the outlet opening 8 aligned in the axial direction of the outlet channel 5.

Figure 4:
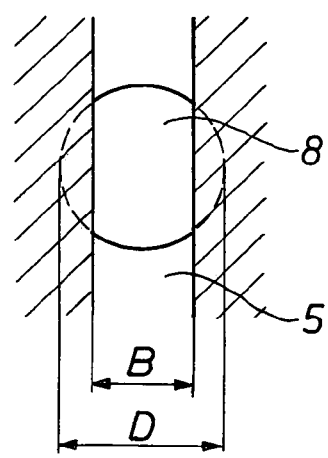
FIG. 4 shows a section through the mixing chamber at the level at which the outlet opening of the mixing chamber opens into the outlet channel.

FIG. 4 shows a section through the mixing chamber 2 at the level at which the outlet opening 8 leads out of the mixing chamber into the outlet channel 5. In this arrangement, and by analogy with the reference numerals in FIG. 2, the diameter, D, indicates the diameter of the mixing chamber and the breadth, B, indicates the breadth of the projected surface of the outlet opening 8 leading out of the mixing chamber into the outlet channel 5.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A mixing head for mixing at least one polyol component and at least one isocyanate component and optionally, additives, to form a polyurethane reaction mixture, the mixing head comprising:

a cylindrical mixing chamber having peripherally arranged thereon at least two inlet nozzles for the components;

a control slide means movable in the mixing chamber in an axial direction between a first (front) position and a second (rear) position having arranged on the periphery thereof one or more grooves, the control slide means arranged so as to permit the components to enter the grooves through the inlet nozzles, flow through the grooves and exit the grooves through outlets when the control slide means is in the first (front) position and to enter the mixing chamber through the inlet nozzles when the control slide means is in the (second) rear position;

an outlet channel connected downstream of the mixing chamber and arranged at an angle of between about 40° and about 140° with respect to the mixing chamber; and a cleaning slide means movable in the outlet channel in the axial direction, wherein the diameter, D, of the mixing chamber is larger by a factor of about 1.1 to about 5 than the breadth, B, of a projected surface of an outlet opening leading out of the mixing chamber into the outlet channel.

2. The mixing head according to claim 1, wherein the diameter, D, of the mixing chamber is larger by a factor of about 1.2 to about 3 than the breadth, B, of the projected surface of the outlet opening leading out of the mixing chamber into the outlet channel.

3. The mixing chamber according to claim 1, wherein the diameter, D, of the mixing chamber is larger by a factor of about 1.5 to about 2 than the breadth, B, of the projected surface of the outlet opening leading out of the mixing chamber into the outlet channel.

4. The mixing head according to claim 1, wherein the projected surface of the outlet opening leading out of the mixing chamber into the outlet channel is substantially rectangular.

5. The mixing head according to claim 4, wherein the ratio between the height, A, of the rectangular projected surface of the outlet opening leading out of the mixing chamber into the outlet channel which is not covered by the cleaning slide means and the breadth, B, of the rectangular projected surface of the outlet opening leading out of the mixing chamber into the outlet channel A:B is about 0.05 to about 5.

6. The mixing head according to claim 1, wherein the ratio between the length, H, of the mixing chamber in the axial direction, limited by the end face of the control slide means on the one side and by the outlet opening leading out of the mixing chamber into the outlet channel, and the diameter, D, of the mixing chamber H:D is about 0.1 to about 1.

7. The mixing head according to claim 1, wherein the ratio between the diameter, d, of the largest of the inlet nozzles and the diameter, D, of the mixing chamber lies in the range between about 0.01 and about 0.2.

8. The mixing head according to claim 4, wherein the ratio between the height, A, of the rectangular projected surface of the outlet opening leading out of the mixing chamber into the outlet channel which is not covered by the cleaning slide means and the breadth, B, of the rectangular projected surface of the outlet opening leading out of the mixing chamber into the outlet channel A:B is about 0.1 to about 1.

9. The mixing head according to claim 4, wherein the ratio between the height, A, of the rectangular projected surface of the outlet opening leading out of the mixing chamber into the outlet channel which is not covered by the cleaning slide means and the breadth, B, of the rectangular projected surface of the outlet opening leading out of the mixing chamber into the outlet channel A:B is about 0.2 to about 0.5.

10. The mixing head according to claim 1, wherein the ratio between the length, H, of the mixing chamber in the axial direction, limited by the end face of the control slide means on the one side and by the outlet opening leading out of the mixing chamber into the outlet channel, and the diameter, D, of the mixing chamber H:D is about 0.2 to about 0.8.

11. The mixing head according to claim 1, wherein the ratio between the length, H, of the mixing chamber in the axial direction, limited by the end face of the control slide means on the one side and by the outlet opening leading out of the mixing chamber into the outlet channel, and the diameter, D, of the mixing chamber H:D is about 0.3 to about 0.6.

12. The mixing head according to claim 1, wherein the ratio between the diameter, d, of the largest of the inlet nozzles and the diameter, D, of the mixing chamber lies in the range between about 0.01 and about 0.15.

13. The mixing head according to claim 1, wherein the ratio between the diameter, d, of the largest of the inlet nozzles and the diameter, D, of the mixing chamber lies in the range between about 0.015 and about 0.1.

* * * * *